United States Patent [19]

Bloch-Malem

[11] Patent Number: 5,440,359

[45] Date of Patent: Aug. 8, 1995

[54] LENSES AND SPECTACLES FOR REDUCING NYSTAGMIC OSCILLATIONS, AND A METHOD FOR ACHIEVING THIS PURPOSE

[76] Inventor: Raymonde Bloch-Malem, 11 Arlozorov Street, Jerusalem 92181, Israel

[21] Appl. No.: 191,639

[22] Filed: Feb. 4, 1994

[30] Foreign Application Priority Data

Feb. 28, 1993 [IL] Israel ................... 104884

[51] Int. Cl.⁶ ............ G02C 7/04; G02C 7/10; G02C 7/02; A61B 3/00
[52] U.S. Cl. ................... 351/203; 351/246; 351/45; 351/162; 351/163; 351/165
[58] Field of Search ............ 351/203, 246, 41, 45, 351/46, 162, 163, 165, 47, 48

[56] References Cited

U.S. PATENT DOCUMENTS

| | | | |
|---|---|---|---|
| 1,584,041 | 5/1926 | Shaver | 351/47 |
| 1,647,626 | 11/1927 | Hopson | 351/45 |
| 1,882,909 | 10/1932 | Rhue | 351/45 |
| 4,678,296 | 7/1987 | Smith | 351/45 |
| 4,961,640 | 10/1990 | Irien | 351/44 |
| 4,979,902 | 12/1990 | Morelle et al. | 434/184 |
| 5,189,445 | 2/1993 | Stagner | 351/45 X |

FOREIGN PATENT DOCUMENTS 206315 11/1955 Australia ................. 351/45

*Primary Examiner*—William L. Sikes
*Assistant Examiner*—David R. Parsons
*Attorney, Agent, or Firm*—Foley & Lardner

[57] ABSTRACT

The invention provides a tinted pair of lenses for overcoming the deleterious effects of nystagmic oscillations, particularly in persons suffering from dyslexia, the tinting varying along the lateral direction and extending in each lens over at least two zones, a lighter tint being used in a first zone extending from the lens edge nearest to the nose of the wearer, when the lens is in use, to a position corresponding to the centre of the pupil, and a darker tint being used in a second zone extending over the remaining lens area.

12 Claims, 1 Drawing Sheet

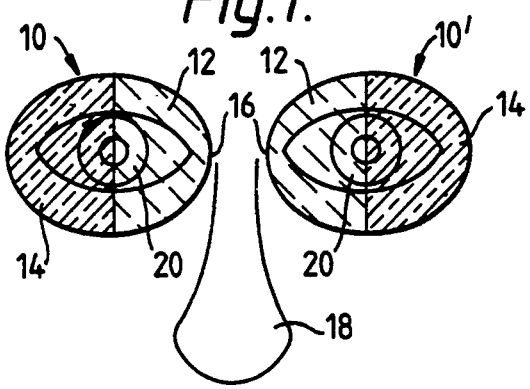
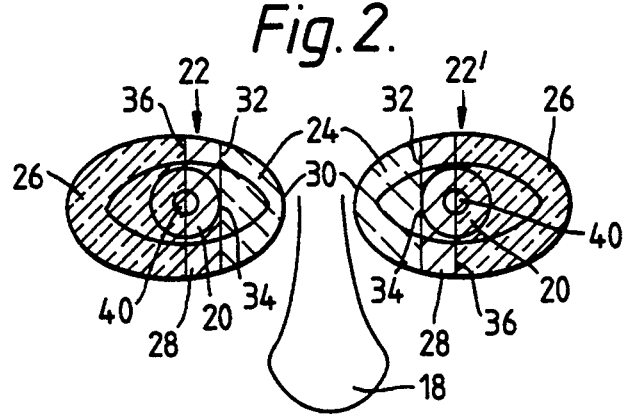
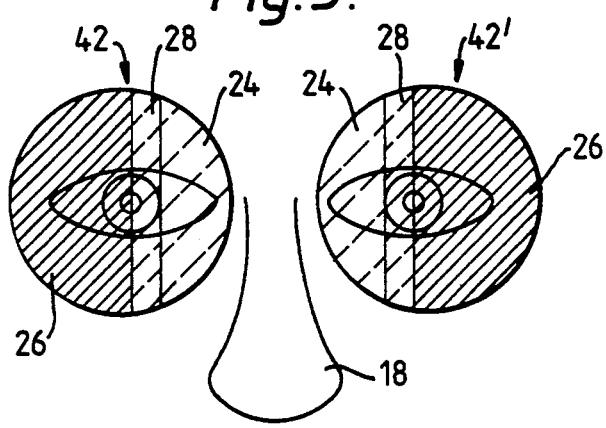
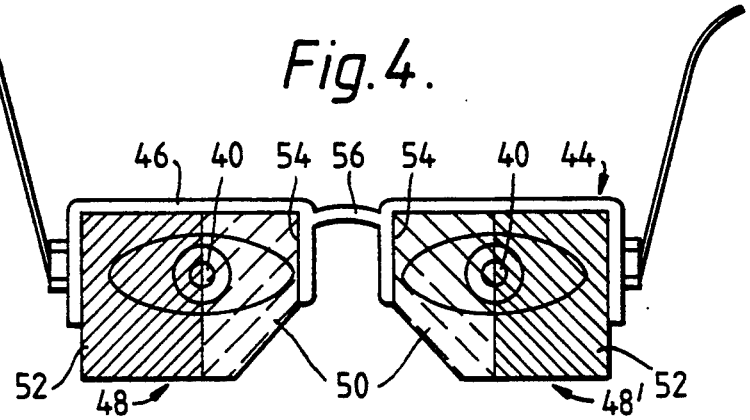

LENSES AND SPECTACLES FOR REDUCING NYSTAGMIC OSCILLATIONS, AND A METHOD FOR ACHIEVING THIS PURPOSE

The present invention relates to a method for improving human vision by reducing nystagmic oscillations of the eye, and to lenses and spectacles for this purpose.

More particularly, the invention is concerned with providing a method of concentrating in a forward direction the vision of a patient suffering from such oscillations and thereby to achieve a significant improvement in impaired reading and symbol recognition performance.

Dyslexia is a developmental disorder concerning learning or language disability which may be explained by difficulties, in varying degrees, of auditory and visual discrimination, in difficulty in orienting in space and time, in analytical difficulties and in partial failures in short and long-term memory.

A dyslectic will confuse similar printed musical notes, similar letters such as b, d, p, q and mathematical signs such as × and +. There will be difficulty in following the sequential order of letters in a word, such as confusing the words 'on' and 'no'. Studies have shown 5% to 10% of children being dyslectic, as broadly defined, to some degree.

Obviously dyslectic children will perform poorly in school, and parents, suspecting defective eyesight, will often arrange for a child to undergo an eye examination. When the problem is one of nystagmic oscillations, the results of orthoptic and optic examinations will frequently fail to reveal any abnormality. A correct diagnosis can however be achieved by observation of the patient's eyes in response to the movement of an object placed 30 cm. from the eye of the patient and moved from center to left and from center to right.

A known method of attempting to treat said oscillations is to subject the patient to a series of exercises, such as:
  a. prism exercises involving convergency and divergency;
  b. third degree synoptophoric sessions including foveal test;
  c. physidogie diplopia exercises; and
  d. reading exercises where part of the text not being presently read is covered with a white cardboard.

The results of such treatment usually indicate some improvement, but the problem of nystagmic oscillations remains.

In U.S. Pat. No. 4,961,640 Irlen proposes the use of tinted lenses for alleviating over-stimulation of receptor cells in the wave-length band of 425 to 575 nanometers. The symptoms suggested as benefiting from such lenses are reduced visual resolution, impaired peripheral vision, impaired depth perception and ocular vertigo. No suggestion is made regarding the treatment of nystagmic oscillations. The invention proposes a wide palette of filter colours including pink and peach, singly or in combination with blue, green, gray, purple, goldenrod and yellow tints, and combinations of the above. No mention is made of variably opaque lenses.

In U.S. Pat. No. 4,979,902 Morelle relates to a method for restricting peripheral field vision, so as to provide a dyslexic reader physical means for central field of sight concentration in order to narrowly confine the central vision of the reader so as to prevent eye wander, and proposes the focusing of the reader's central direct field of vision by narrowing it by the use of defocusing or other lenses leaving only a small central area of the lens arranged for providing clear viewing in a narrow reading field. Spectacles of this type would substantially eliminate the user's peripheral vision, an undesirable limitation in many circumstances. Grinding such special lenses also involves costs considerably higher than that of mass-produced prescription lenses. No mention is made of using tinted lenses.

As is well known, tinted lenses are widely used in sunglasses, the lenses being either uniformly dark, or the upper part of the lens being darker than the central and lower parts to shield the user from excessive direct or diffuse solar radiation directed at the eye generally from a direction well above the horizon. Partially tinted windshields in motor vehicles serve the same purpose. Where the lens or windshield is unevenly tinted, the darker zone is invariably adjacent to the upper edge.

It is therefore one of the objects of the present invention to obviate the disadvantages of the prior-art apparatus and methods and to provide a lens of conventional shape and dimensions which will enable a person suffering from nystagmic oscillations to greatly improve his or her performance in writing, reading and in symbol recognition tasks.

Thus, the present invention achieves by providing a tinted pair of lenses for overcoming the deleterious effects of nystagmic oscillations, particularly in persons suffering from dyslexia, said tinting varying along the lateral direction and extending in each lens over at least two zones, a lighter tint being used in a first zone extending from the lens edge nearest to the nose of the wearer, when the lens is in use, to a position corresponding to the centre of the pupil, and a darker tint being used in a second zone extending over the remaining lens area.

In a preferred embodiment of the present invention there is provided a tinted pair of lenses wherein said first zone extends only from said lens edge to a first vertical line tangental to the corresponding position of the inner edge of the iris when the lens is in use, said lens being arranged to include a third zone provided with an intermediate degree of opacity, said third zone occupying an area extending from said first line to a parallel second line crossing a point corresponding to the centre of the pupil.

In a most preferred embodiment of the present invention the colour of the lens is a mid-green.

The invention also provides spectacles for the same purpose, and also a method.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 shows a front view of a preferred embodiment of a pair of lenses of the invention;

FIG. 2 shows a similar pair of lenses provided with three tinted zones;

FIG. 3 shows a third pair of lenses having graduated tinting; and

FIG. 4 shows a pair of spectacles fitted with tinted lenses according to the invention.

There is seen in FIG. 1 a tinted pair of lenses 10, 10'. Tinting varies along the lateral direction and extends in each lens over at least two zones 12, 14. A lighter tint is used in the first zone 12, which extends from the lens edge 16 positioned nearest to the nose 18 of the wearer, when the lens is in use, to a position corresponding to the centre of the iris 20 and pupil. A darker tint is used in the second zone 14 which extends over the remaining lens area.

In use the lenses 10, 10' are used mainly for reading and writing where the text is positioned directly in front of the lens wearer at a distance of 30 centimeters.

Advantageously the lenses 10, 10' are standard prescription lenses before tinting. Thereby the cost of grinding specially shaped lenses is avoided.

The lenses 10, 10', much smaller than illustrated, may take the form of contact lenses.

The preferred colour used for tinting the lenses is green, this colour being about ninety percent effective. Two further colours containing green are effective to a lesser extent i.e., approximately sixty to seventy percent effective. These colours are brown, composed of green with some additional red, as well as gray prepared from a combination of green, red and white.

While not all possible tint colours have been investigated, it has been found that red, yellow and blue as well as yellowish green and bluish green are not effective.

As indicated, best results are obtained with a mid green, which can be defined as having a wavelength that falls within the range of 5300 to 5400 angstrom units which is marketed as graduated green No. 3 by Esselor France.

FIG. 2 shows a pair of lenses 22, 22' each divided into three differently-tinted zones 24, 26, 28.

The first zone 24, extends only from the lens edge 30 positioned nearest to the nose 18 of the wearer to a first vertical line 32 tangental to the corresponding position of the inner edge 34 of the iris 20 when the lens is in use. The first zone 24 is provided with a very pale tint. In a further embodiment the zone 24 is clear.

The second zone 26, provided with the darkest tint similar to the zone 14 in FIG. 1, extends from a second line 36, parallel to the line 32, and crossing a point corresponding to the centre of the pupil 40.

A third zone 28 is provided with an intermediate degree of opacity, this zone occupying the area defined between the lines 32, 36. The provision of three tint zones provides better results than obtainable from two zones at only slightly increased cost.

Seen in FIG. 3 are a tinted pair of lenses 42, 42'. Tinting gradually varies in opacity in the lateral direction, the lightest tint being used in the first zone 24 and the darkest tint in the second zone 26, as defined with reference to FIG. 2. However, as tinting varies gradually, the zone 24 and the third zone 28 and the zones 26 28 merge imperceptibly with each other.

FIG. 4 shows a pair of tinted lens spectacles 44, the spectacle frame 46 being of conventional design. The lenses 48, 48' are tinted, opacity varying in the lateral direction and extending in each lens over at least two zones 50, 52. A lighter tint is used in the first zone 50 extending from the lens edge 54 nearest to the bridge 56 of the spectacles 44, to a position corresponding when the spectacles 44 are in use, to the area of the pupil 40, e.g., the center or tangent to the pupil dependent on eye displacement of the patient at rest. A darker tint is used in a second zone 52 extending over the remaining lens area. Where the needs of the user so indicate, lenses 48, 48' are of the bi-focal or multi-focal type.

The invention also provides for a method of treatment for overcoming the deleterious effects of nystagmic oscillations, particularly in patients suffering from dyslexia.

The method comprises the interposition of at least one tinted transparent body acting as a filter between at least one eye of the patient and the object to be viewed.

Tinting varies in the lateral direction and extends over at least two zones.

A lighter tint is used in a first zone extending from a line near to the nose of the patient when the transparent body is in use, to a position corresponding to the centre of the pupil of the patient. A darker tint is used in a second zone extending over the outer area of the transparent body.

The lenses described in the present specification have been tested. A 50 year old male myopic patient had suffered from dyslexia from childhood. After being fitted with lenses according to the present invention, providing a very slight prismatic correction, he was able to read type of different sizes on a single page and additionally was able to see for the first time certain symbols previously unknown to him.

E.G., suffering from nystagmic oscillations, was fitted with spectacles according to the present invention. He reports the following benefits:

1. There is less eye flicker, the image is stationary, and is consequently easier to focus on and to read.
2. The spaces between letters are clear.
3. My speed in writing small Hebrew characters was increased 100%.
4. My accuracy and style has much improved when writing small text.
5. I no longer suffer from seeing a double image when reading.
6. I can now read small condensed print which was previously not possible.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A tinted pair of lenses for overcoming the deleterious effects of nystagmic oscillations, particularly in persons suffering from dyslexia, said tinting varying along the lateral direction, extending in each lens over at least two zones, and being respectively uniform along each one of a predetermined number of imaginary vertical lines in each zone, a lighter tint being used in a first zone extending from the lens edge nearest to the nose of the wearer, when the lens is in use, to a position corresponding to the centre of the pupil, and a darker tint being used in a second zone extending over the remaining lens area.

2. The tinted pair of lenses as claimed in claim 1, wherein said lenses are standard prescription lenses being tinted.

3. The tinted pair of lenses as claimed in claim 1, wherein said tinting gradually varies in opacity in the lateral direction, the lightest tint being used in said first zone and the darkest tint in said second zone.

4. The tinted pair of lenses as claimed in claim 1, wherein the colour used for said tinting is green.

5. The tinted pair of lenses as claimed in claim 4, wherein the wavelength of the green colour falls within the range of 5300 to 5400 angstrom units.

6. The tinted pair of lenses as claimed in claim 4 wherein said colour used for said tinting is based on a combination of green and red to form a brown or gray tinted lens.

7. A tinted pair of lenses for overcoming the deleterious effects of nystagmic oscillations, particularly in persons suffering from dyslexia, said tinting varying along the lateral direction and extending in each lens over at least three zones, a lighter tint being used in a first zone extending from an inner edge of the lens to a first vertical line tangential to the corresponding position of the inner edge of the iris when the lens is in use, and darker tint being used in a second zone extending from a parallel second line crossing a point corresponding to the centre of the pupil to an outer edge of the lens, each of said lens being arranged to include a third zone provided with an intermediate degree of opacity between the lighter tint and the darker tint, said third zone occupying an area extending from said first vertical line to said parallel second line.

8. A tinted pair of contact lenses for overcoming the deleterious effects of nystagmic oscillations, particularly in persons suffering from dyslexia, said tinting varying along the lateral direction and extending in each lens over at least two zones, a lighter tint being used in a first zone extending from the lens edge nearest to the nose of the wearer, when the lens is in use, to a position corresponding to the centre of the pupil, and a darker tint being used in a second zone extending over the remaining lens area.

9. Tinted lens spectacles for overcoming the deleterious effects of nystagmic oscillations, said tinting varying in the lateral direction, extending in each lens over at least two zones, and being respectively uniform along each one of a predetermined number of imaginary vertical lines in each zone, a lighter tint being used in a first zone extending from the lens edge nearest to the bridge of said spectacles, to a position corresponding when the spectacles are in use, to the centre of the pupil, and a darker tint being used in a second zone extending over the remaining lens area.

10. The tinted lens spectacles as claimed in claim 9, wherein said lenses are of the bi-focal type.

11. The tinted lens spectacles as claimed in claim 9, wherein said lenses are of the multi-focal type.

12. A method for overcoming the deleterious effects of nystagmic oscillations, particularly in patients suffering from dyslexia, said method comprising the interposition of at least one tinted transparent body acting as a filter between at least one eye of said patient and the object to be viewed, said tinting varying in the lateral direction, extending over at least two zones, and being respectively uniform along each one of a predetermined number of imaginary vertical lines in each zone, a lighter tint being used in a first zone extending from a line near to the nose of the patient when the transparent body is in use, to a position corresponding to the centre of the pupil of the patient, and a darker tint being used in a second zone extending over the outer area of said transparent body.

* * * * *